United States Patent [19]
Shearer, Jr.

[11] Patent Number: 6,014,740
[45] Date of Patent: *Jan. 11, 2000

[54] SINGLE INSTRUCTION METHOD OF SEIZING CONTROL OF PROGRAM EXECUTION FLOW IN A MULTIPROCESSOR COMPUTER SYSTEM

[75] Inventor: Bennie L. Shearer, Jr., Humble, Tex.

[73] Assignee: BMC Software, Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/834,025

[22] Filed: Apr. 11, 1997

[51] Int. Cl.[7] .............................. G06F 9/30; G06F 9/38; G06F 9/44

[52] U.S. Cl. ............................................. 712/233; 712/210

[58] Field of Search ...................................... 712/233, 210

*Primary Examiner*—Krisna Lim
*Attorney, Agent, or Firm*—Arnold White & Durkee

[57] ABSTRACT

A single-instruction method of diverting or "hooking" the operation of software entails setting up a work area of code at an address within the range of a relative branching instruction type defined in the operating-system architecture. Hooking is accomplished by patching the software in question to insert a single relative-branch instruction. That instruction causes program execution to be diverted to the work area. In one embodiment, the work area is an area of memory that normally is used only for system initialization and thus would not otherwise be executed by the processor system after system initialization is complete.

7 Claims, 4 Drawing Sheets

BEFORE HOOKING

| * * * |
|---|
| 0003 WRITE "0007" INTO REGISTER X |
| 0004 IF TODAY IS TUESDAY, JUMP TO INSTRUCTION WHOSE ADDRESS IS SPECIFIED IN REGISTER X |
| * * * |
| MEMORY SYSTEM (RAM, ROM, ETC.) 120 |

FIG. 3A
(PRIOR ART)

AFTER HOOKING

| * * * |
|---|
| 0003 WRITE "1052" INTO REGISTER X |
| 0004 IF TODAY IS TUESDAY, JUMP TO INSTRUCTION WHOSE ADDRESS IS SPECIFIED IN REGISTER X |
| * * * |
| MEMORY SYSTEM (RAM, ROM, ETC.) 120 |

FIG. 3B
(PRIOR ART)

BEFORE HOOKING

| * * * |
|---|
| 0008 READ DATA |
| 0009 DO CALCULATION |
| * * * |
| MEMORY SYSTEM (RAM, ROM, ETC.) 120 |

FIG. 4A
(PRIOR ART)

AFTER HOOKING

| * * * |
|---|
| 0008 READ DATA |
| 0009 SET-UP INSTRUCTION |
| 0010 JUMP TO HOOK CODE |
| 0011 DO CALCULATION |
| * * * |
| MEMORY SYSTEM (RAM, ROM, ETC.) 120 |

SINGLE INSTRUCTION METHOD OF SEIZING CONTROL OF PROGRAM EXECUTION FLOW IN A MULTIPROCESSOR COMPUTER SYSTEM

FIELD OF THE INVENTION

The invention relates to a method of modifying the software controlling the operation of a multiprocessor computer system through the use of a single instruction to branch or "jump" to a different control path, without the need to halt operation of the system through the use of a "lock."

BACKGROUND OF THE INVENTION

Computer Systems and Program Flow

Figure 1:
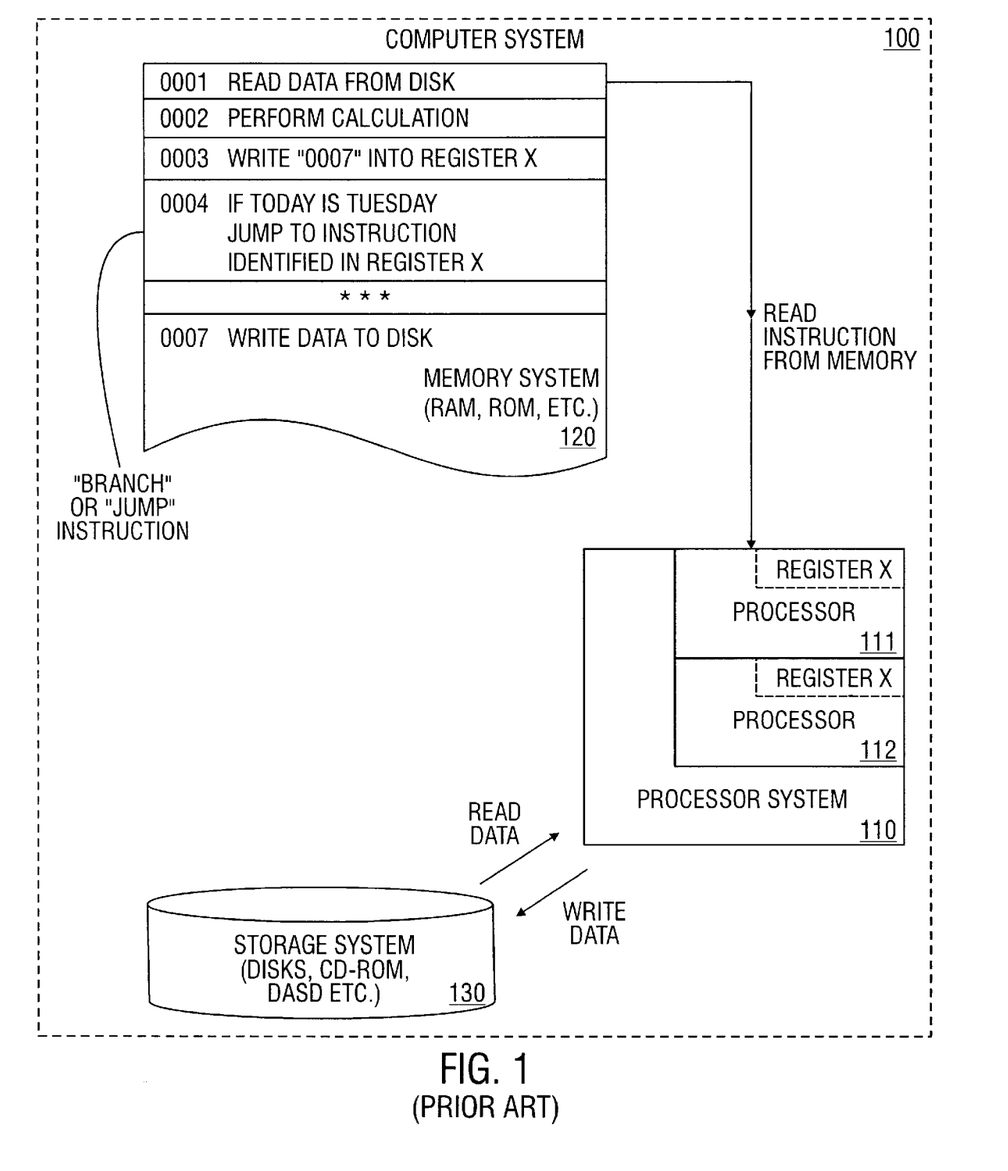
FIGS. 1 and 2 are block diagrams illustrating some conventional ways by which a computer system might execute program instructions.

As is well-known in the art, modern computers are normally controlled by computer programs, commonly referred to as "software." FIG. 1 shows a greatly simplified illustration of a hypothetical computer system 100 controlled by software.

The computer system 100 is a hypothetical one intended for illustrative purposes. Those of ordinary skill having the benefit of this disclosure will recognize that the computer system 100 is representative of numerous conventional computer systems such as, e.g., the HP 9000 system.

The software that controls the computer system 100 typically takes the form of one or more series of instructions (and data) executed by a processor system 110. The processor system 110 may comprise one or more processors commonly referred to as central processing units (CPU). A well-known example of a processor is the Intel Pentium microprocessor.

The instructions, often referred to as "code" (and related groups of which are often referred to as "routines") are stored into the internal memory system 120 of the computer system 100 The memory system 120 may comprise read-write random access memory (RAM) and/or read-only memory (ROM).

The processor system 110 initially loads the instructions into the memory system 120 by copying them from the storage system 130. It does so because in operation the memory system 120 is usually very much faster than the storage system 130; the memory system 120 thus serves as a kind of working scratch pad for the processor system 110.

The storage system 130 may take a variety of forms. In a typical computer the storage system may include floppy disks, a so-called hard disk, and perhaps a CD ROM. In mainframe computers the storage system may include a Direct Access Storage Device (DASD) system, which is a special kind of hard disk system.

At some point after loading the instructions into the memory system 120, the processor system 110 reads the instructions from the memory system and performs the operations erations specified in the instructions. (The instructions are sometimes read one by one but often in a batch for greater speed.) The instructions at locations 0001, 0002, etc. in the memory system 120 are commonly executed one after another.

The locations of the various instructions within the memory system 120 are commonly referred to as the "addresses" of the instructions. An instruction that is located at a given address is sometimes said to "reside" at that address.

In the example shown in FIG. 1, the processor system 110 performs a memory access operation to read an instruction from a specific address in the memory system 120 (e.g., address 0001). The processor system then performs the operation specified by that instruction (in this case, reading data from a disk). It then continues with the instruction in the next address (in this case, address 0002).

Branching Problems in Multiprocessor Computer Systems

Sometimes instructions are not executed entirely in sequence. In FIG. 1, the hypothetical instructions at addresses 0003 and 0004 form what is referred to as a "branch" or sometimes as a "jump." Instruction 0003 causes the processor system 110 to store the number 0007 in a register X. (In this context a "register" is a temporary data-storage area.) Instruction 0004 causes the processor to determine whether the day of the week is Tuesday and, if so, to jump to the address specified in register X—which in this case is instruction 0007.

The branch shown in the simplified illustration of FIG. 1 is a two-instruction operation. Instruction 0003 is a function entry point set-up instruction which calls for loading of data into a temporary storage area, i.e., register X, while instruction 0004 is the actual jump instruction. In many implementations, branching may involve even more set-up instructions.

Multiple-instruction branching can cause problems in a multiprocessor computer system. As the name suggests, in a multiprocessor computer system the processor system 110 has multiple processors, e.g., multiple CPUs. A simplified example is shown in FIGS. 1 and 2, where the processor system 110 has two processors 111 and 112.

In multiprocessor computer systems, the various processors typically fetch common program instructions from the memory system 120. An analogy would be to have multiple workers utilizing a single copy of an instruction manual for performing a complex task on a time-shared basis. That means that in a multiple-instruction branching operation, the instructions might have changed (e.g., through action by another processor) in between the time that a processor 111 or 112 did its initial set-up processing and the time it reached the actual jump instruction. This is especially true when, as is often the case, the processors use "pipelining" techniques to read ahead in the list of instructions stored in the memory system 120. As a result, when a processor actually executes the jump instruction, it might not have executed the newly-modified set-up instructions and thus might execute the jump instruction incorrectly.

Suppose that in the hypothetical example of FIG. 1, the processor 111 executes the set-up instruction 0003 and stores the value "0007" in its register X.Then suppose that before the processor 111 actually executes the jump instruction 0004, the set-up instruction is changed (e.g., by the processor 112) to specify a jump address other than 0007. That can cause serious problems for the computer system, even causing the computer system to crash.

Figure 2:
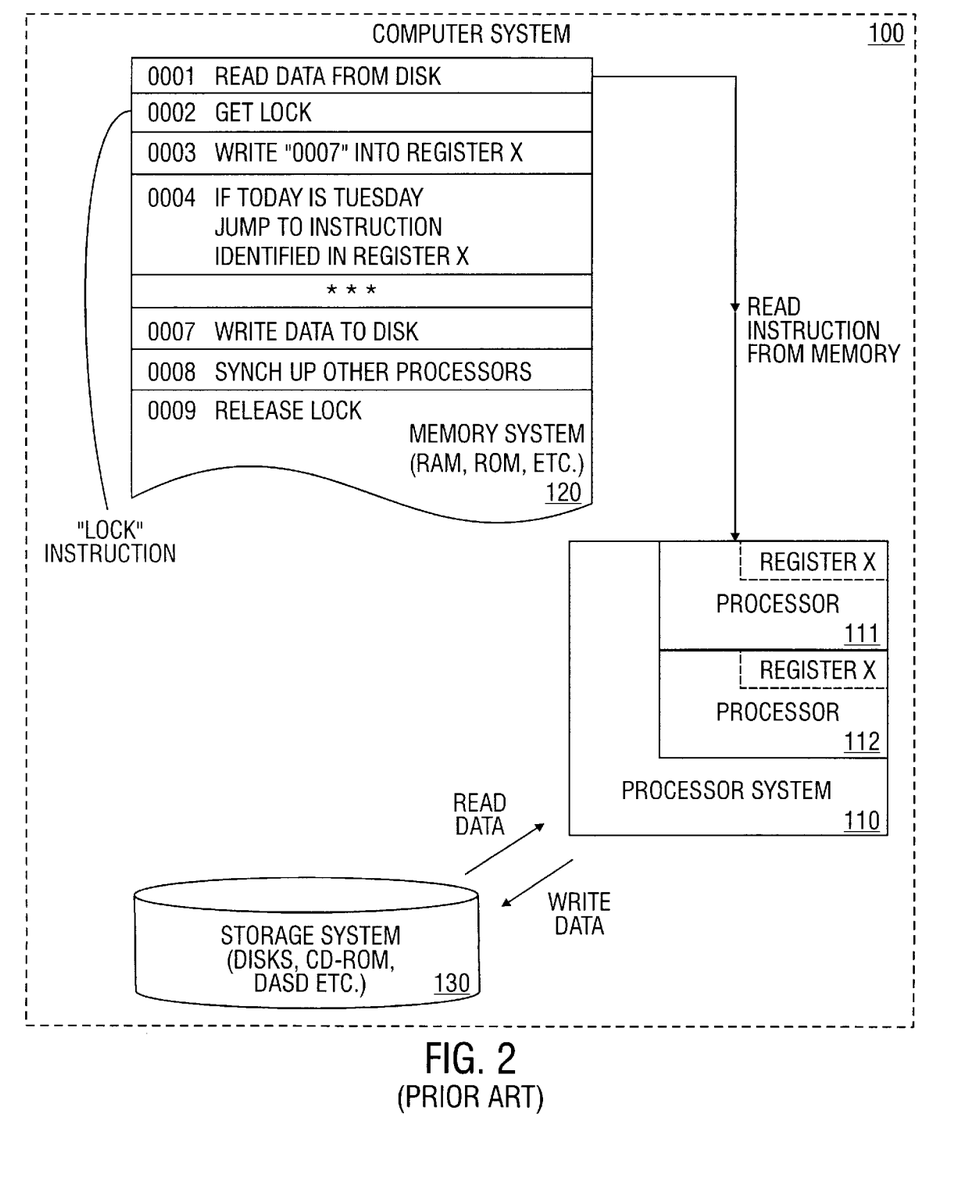

Referring to FIG. 2, this problem is commonly handled in designing software by including in the instructions what are referred to as "lock" instructions such as that shown at address 0002. A lock instruction is a resource-protection facility that is provided by, e.g., the operating-system software of a computer system.

Somewhat analogous to a traffic light, the lock instruction 0002 permits one processor to seize control of the system and take action without fear of unintentional interference by other processors. The controlling processor can then later issue instructions to cause other processors to "synch up" (synchronize their operations) with the controlling processor (instruction 0008 in FIG. 2), followed by issuing a release-lock instruction to permit the other processors to resume their normal operations (instruction 0009).

Resulting Difficulties in "Hooking" Software Execution

The problems of multiple-instruction branching make it difficult to "hook" (seize control of) the execution of software instructions in a memory system 120. Hooking is a branching technique by which software can be edited or patched "on the fly" (normally by other software) for a variety of reasons, e.g., to improve the performance of the software. For example, the assignee of this application, BMC Software, distributes a number of software packages that use hooking techniques to change the operation of other software such as IBM's VTAM communications software.

Hooking is typically carried out by a processor that executes instructions causing one or more other instructions to be changed even while they are stored in the memory system 120. That has the effect of changing the behavior of the computer system when the edited instruction is executed.

Figure 3A:
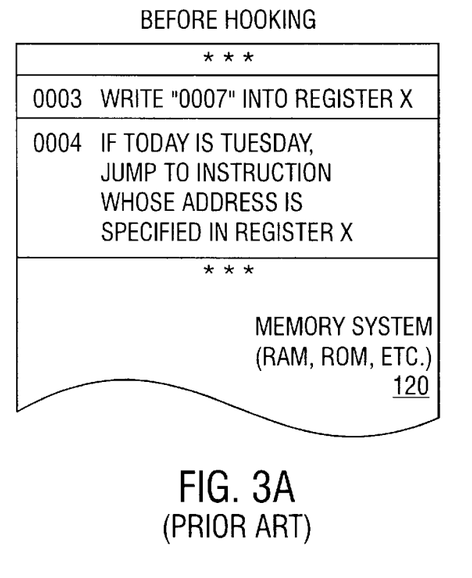
FIGS. 3A, 3B, 4A and 4B are before-and-after block diagrams illustrating the results of two prior-art methods of patching code in memory.
Figure 3B:
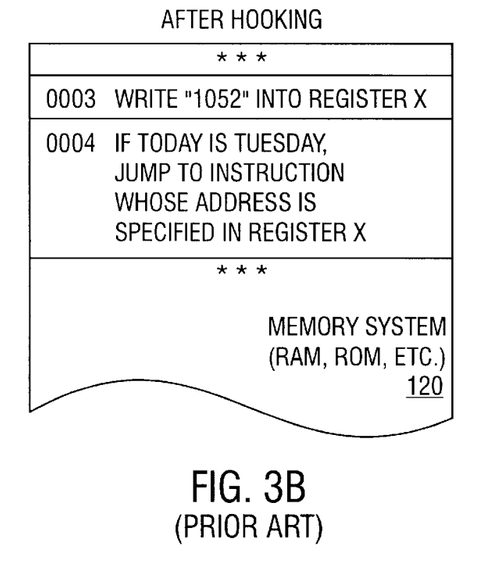
Figure 4A:
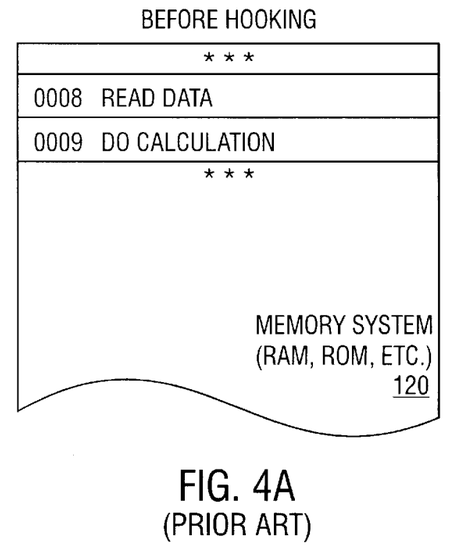
Figure 4B:
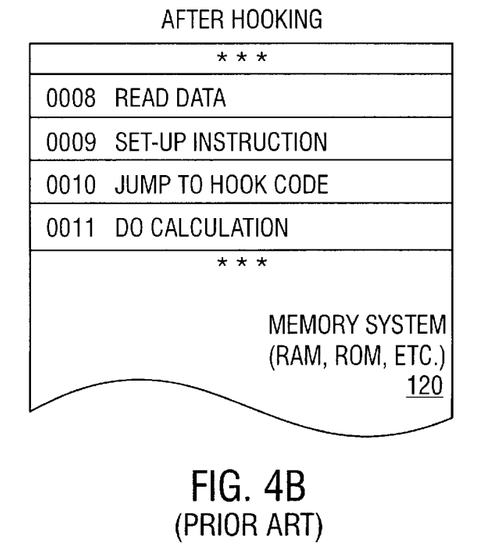

Before-and-after examples of two different types of hooking are shown in FIGS 3A, 3B, 4A, and 4B. In FIG. 3B, the instruction at address 0003 is patched so that the value "1052," not "0007" as shown in FIG. 3A, is loaded into register X; that causes the next instruction 0004 to jump to the instruction at address 1052 instead of the instruction at address 0007. On the other hand, in FIG. 4B an instruction to jump to a completely new segment of code is patched in between instructions 0008 and 0009 of FIG. 4A.

Hooking may be accomplished in different ways; two techniques are described here as examples. The first technique is accomplished via hardware instructions that allow direct write access to physical storage such as the memory subsystem 120, bypassing the address translation hardware logic (known commonly as dynamic address translation or hardware address translation). In this method, the physical address of a location in the memory subsystem 120 is acquired through the use of instructions or existing function calls provided by the operating environment. Once the physical address has been acquired, a jump instruction is written to that location; the instruction caches of the processor 111, 112, etc., may be flushed to eliminate any residual information about that address in cache. As a result, the processors 111, 112, etc., fetch the jump instruction from the memory subsystem 120 on their next reference. The flush operation will cause all processors in the processor system 110 to flush their caches at substantially the same time. This may involve delaying continuing execution of the modified program code until such time as all caches have been flushed (this time delay is normally a guaranteed time within which all processors will have flushed their cache).

Another technique is to programmatically alter the information in the dynamic address translation, hardware address translation, or equivalent hardware translation tables to allow direct storage of the jump instruction. This may be required due to the fact that in many implementations, executable code segments are treated as read-only segments of memory. By altering the translation tables, the write is temporarily allowed and then the translation tables are set back to their initial state. Flushes of the caches, as described above, may be required also, but on many architectures the required synchronization of the caches is handled by the hardware in a multi-CPU environment when the cache is written into in order to insure that all CPUs see that 'new' data in memory.

Hooking can be dangerous in a multiprocessor computer system because it may be necessary to edit multiple instructions as part of the hooking process. That gives rise to the possibility that one processor might execute an edited instruction, but that other processors might race ahead to execute unedited instructions, perhaps with disastrous results.

Locks can sometimes be used to address this problem as described above. Locks are not always available, however, and may also be inefficient because they can adversely affect the performance of at least a portion of the computer system.

SUMMARY OF THE INVENTION

A method in accordance with the invention uses a single-instruction technique to hook the operation of software. The method entails setting up a predefined segment of code in memory for handling the hooking operation. The predefined code segment resides at an address within the range of a relative branching instruction type defined in the operating-system architecture. The "hook" is accomplished by patching the software in question to insert a single relative-branch instruction. That instruction causes program execution to be diverted to the predefined code segment. In one embodiment, the predefined code resides in an area of memory that normally is used only for system initialization and therefore would not otherwise be executed by the processor system.

DETAILED DESCRIPTION OF SPECIFIC EMBODIMENTS

Illustrative Method

An illustrative embodiment of a method in accordance with the invention is described below. In the interest of clarity, not all features of actual implementations are necessarily described in this specification. It will of course be appreciated that in the development of any such actual implementation, as in any such project, numerous programming decisions must be made to achieve the developers' specific goals and subgoals (e.g., compliance with system- and business-related constraints), which will vary from one implementation to another. Moreover, attention must, of course, be paid to proper programming practices for the environment in question. It will be appreciated that such a development effort might be complex and time-consuming, but would nevertheless be a routine undertaking for those of ordinary skill having the benefit of this disclosure.

Figure 5:
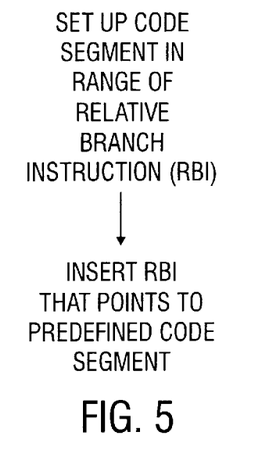
FIG. 5 is a simplified flow chart of the operations performed in executing a method in accordance with the invention.
Figure 6A:
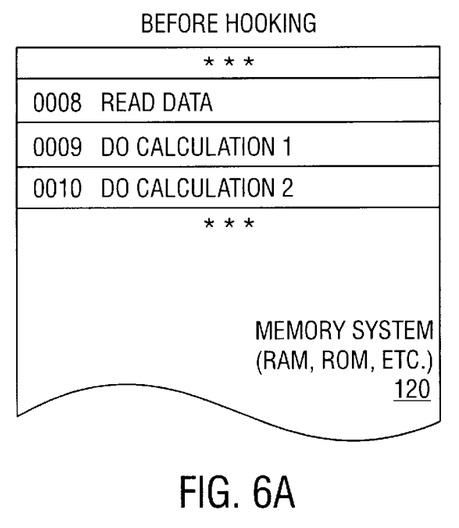
FIGS. 6A and 6B are before-and-after block diagrams of the result of executing the method.
Figure 6B:
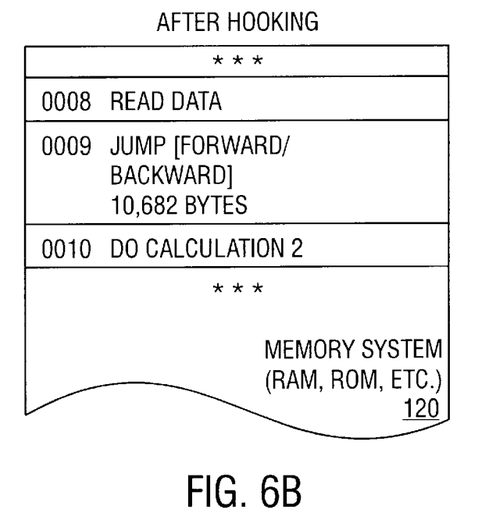

Referring to FIGS. 5, 6A and 6B, an illustrative method of dynamically altering a computer program in memory utilizes a branching instruction that causes the processor system 110 to jump, not to a specific address (e.g., "0007"), but instead to an address that is a specified number of bytes in memory away from the current instruction's address. In some computer systems, e.g., the HP 9000, this is known as a relative branching instruction (RBI). Relative branching instructions are supported in HP UNIX systems and in most modern RISC processor-based systems such as the Alpha systems of Digital Equipment Corporation and the RISC systems of Sun Microsystems.

A predefined segment of code is set up in memory to handle a hooking operation; it is this segment of code that is executed after the processor system 110 executes the relative branching instruction. The predefined code segment resides at an address within the range of the relative branching instruction (which is predefined in the operating-system architecture).

For example, in HP UNIX systems the range of the relative branching instruction is specified by a 17-bit number (16 data bits plus a sign bit). The instruction in such systems therefore can specify a jump forward or backward of up to $2^{16}-1$ times the instruction length (typically 4 bytes), i.e., 262,140 bytes. Similar ranges are defined in the operatins-system architectures of other types of computer systems.

This approach is illustrated in FIGS. 6A and 6B. In the "before" diagram of Figure 6A, instruction 0008 is an instruction for reading data, instruction 0009 is an instruction for performing a first calculation ("calculation 1"),while instruction 0010 is an instruction for performing a second calculation ("calculation 2"). In the "after" diagram of Figure 6B, the instruction for performing "calculation 1 " (instruction 0009 has been replaced by a single instruction to jump to a relative base address where, for example, some routine requiring synchronization or consistency among process and/or processors in a multiprocessor may be stored. In the preferred embodiment, the instruction previously stored at address 0009 (i.e., "calculation 1") is temporarily stored at another location and is executed before returning to execute instruction 0010, i.e., "calculation 1" is performed before control is returned to the hooked program at instruction 0010.

New instruction 0009 is a relative branching instruction that causes the processor system 110 not to jump to a specified address, but instead to jump forward or backward by 10,680 bytes. (The number 10,680 is a made-up number that is used for illustrative purposes. Whether the jump is forward or backward is typically specified by a sign bit, so that a jump of +10,680 bytes would be a jump forward, whereas a jump of -10,680 bytes would be a jump backwards.)

The relative branch instruction now residing at address 0009 specifies a predefined work area in memory. The work area is set up for any processing that is desired to occur in between the read-data instruction 0008 and the renumbered do-calculation instruction 0010. The work area can be any area of the memory system 120 that is not used for storing instructions that will be executed by the processor system 110.

In one embodiment, the work area is an area of memory that normally is used only by the operating system for system initialization during start-up. After system initialization is complete, that area of memory goes unused and therefore can safely be used as the predefined code area.

As an example, it has been determined by trial and error that in the HP 9000 computer system, any or all of the memory areas used for the MSGINIT (message initialization), SEMINIT (semaphore initialization), SHMINIT (shared memory initialization), or DNLC_INIT (directory name lookup cache initialization) instructions may be used as the work area. It will be apparent to those of ordinary skill having the benefit of this disclosure that other work areas may be identified in the same manner.

Additional information about the HP 9000 relative branching instruction can be found in Assembly Language Reference Manual, HP 9000 Series 700 and 800 Computers, HP Part No. 92432-90001, Fifth Edition, January 1995 and PA-RISC 1.1 Architecture and Instruction Set Reference Manual, HP Part No. 09740-90039, third edition, February 1994.

Source Code Appendix

Reproduced below is commented computer-program source code for one illustrative implementation of the invention. The source code is copyrighted and is the property of the assignee of this application. Authorization is granted to make copies of the source code in conjunction with making facsimiles of this application and any patent(s) issuing thereon, but all other rights are reserved.

Program Storage Device

Any of the foregoing variations may be implemented by programming a suitable general-purpose processor such as the processor system 110. The programming may be accomplished through the use of a program storage device readable by the machine and encoding a program of instructions executable by the machine for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The storage system 130 may itself constitute the program storage device. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

In the following claims, lettering is used to identify subparagraphs solely for convenient reference and not necessarily to indicate the order in which method operations are performed unless expressly indicated otherwise. For example, unless otherwise clear from the context, labeling of two operations in a claim as subparagraphs (b) and (c) is not intended tended to limit the claim to performance of those operations in that particular order.

It will be appreciated by those of ordinary skill having the benefit of this disclosure that the illustrative embodiments described above are capable of numerous variations without departing from the scope and spirit of the invention. Accordingly, the exclusive rights sought to be patented are as described in the claims below.

```
/*---------------------------------------------------------------
**
** Function name - Sample Function To Call Intercept Code
**
**--------------------------------------------------------------
*/
int ShmIntercept( int action )
    if( RmeGlobal->shm->shm_shmat_shmconv_zap == RME_NORMAL )
    {
/*
** install RME version of shmconv in shmat
*/
```

```
                rc = VerZap3( (int) action,                                           /* request type              */
                              (caddr_t) shmat,                                        /* function for intercept    */
                              (unsigned long) RME_SHMAT_800_SHMCONV_OFFSET,           /* intercept offset          */
                              (unsigned long *) &RmeGlobal->shm->shmat_shmconv_zap,   /* save area                 */
                              (caddr_t) RmeShmconv,                                   /* intercept function        */
                              (caddr_t) shminit,                                      /* relay point               */
                              (int) RME_SHMAT_SHMCONV_VER );                          /* error code to use         */
        if( rc != RME_NORMAL )
        {
           u.u_error = (short) rc;
           goto rme_exit;
        }
/*
** if action is install, set flag
*/
        if( action == RME_ZAP_INSTALL )
           RmeGlobal->shm->shm_shmat_shmconv_zap = RME_ZAP;
     }
rme_exit:
     return( rc );
}
/*-------------------------------------------------------------------
**
** Function name  - VerZap3
**
** Version        - 1.0
**
** Function       - Replace function branch with a relay branch to a new
**                  function
**
**-------------------------------------------------------------------
*/
int VerZap3( action, function, offset, instruction_save, location, relay, verzap_error )
int action;                       /* request type              */
caddr_t function;                 /* function to get intercept */
unsigned long offset;             /* intercept offset into function */
unsigned long * instruction_save; /* instruction save location */
caddr_t location;                 /* intercept function        */
caddr_t relay;                    /* replat point              */
int verzap_error;                 /* error code to use         */
{
   int rc = RME_NORMAL;
   char * hp_inst = NULL;
   unsigned long old_branch = RME_NORMAL;       /* old instructtion    */
   unsigned long new_branch = RME_NORMAL;       /* new instruction     */
   unsigned long i_ldil = RME_NORMAL;           /* new ldil instruction */
   unsigned long i_be = RME_NORMAL;             /* new be instruction  */
   unsigned long i_or = RME_NORMAL;             /* or instruction      */
   unsigned long 10 = RME_NORAAL;               /* work area           */
   unsigned long 11 = RME_NORMAL;               /* work area           */
   unsigned long 12 = RME_NORAAL;               /* work area           */
   unsigned long 13 = RME_NORMAL;               /* work area           */
   unsigned long 14 = RME_NORMAL;               /* work area           */
   unsigned long w_sign = RME_NORMAL;           /* work area           */
   unsigned long w = RME_NORAAL;                /* work area           */
   unsigned long w1 = RME_NORMAL;               /* work area           */
   unsigned long w2 = RME_NORMAL;               /* work area           */
   unsigned long w_displacement = RME_NORMAL;   /* branch displacement */
   unsigned long w_offset = RME_NORMAL;         /* offset to function  */
   int flush_length = (int) ( 4 * sizeof( void *));  /* flush length   */
   char buffer[ RME_MSGBUF ];                   /* message work area   */
/*
** copy instruction from book point
*/
   bcopy( ((caddr_t) function ) + offset,
          (caddr_t) &old_branch,
          sizeof( unsigned long ) );
/*
** save instruction
*/
   *instruction_save = old_branch;
   switch( action )
   {
      case RME_ZAP_VERIFY:
/*
** check for expected opcode
*/
         if(( old_branch & 0xfc000000 ) == 0xe8000000 )
         {
            break;
```

```
            }
            else
            {
/*
** opcode not what we expected
*/
                rc = verzap_error;
                u.u_error = (short) rc;
                goto rme_exit;
            }
            break;
        case RME_ZAP_INSTALL:
/*
** check for expected opcode
*/
            if(( old_branch & 0xfc000000 ) == 0xe8000000 )
            {
/*
** get displacement to the branch area
*/
                w_displacement = (unsigned long)
                        ( (int) relay - (int) 8 )
                        - ( (int) ( (caddr_t) function + (int) offset ) );
/*
** build first part of relay branch - LDIL
*/
                i_ldil = i_ldil | 0x20200000;           /* set opcode                        */
                w_offset = ((unsigned long) location ) >> 11;  /* right shift by 11          */
                10 = ( w_offset & 0x00100000 ) >> 20;   /* get bit 20 from bit 11            */
                11 = ( w_offset & 0x000ffe00 ) >> 9;    /* get bits 9..19 from bits 12..22   */
                12 = ( w_offset & 0x00000180 ) >> 7;    /* get bits 5..6 from bits 23..24    */
                13 = ( w_offset & 0x0000007c ) >> 2;    /* get bits 0..4 from bits 25..29    */
                14 = ( w_offset & 0x00000003 );         /* get bits 7..8 from bits 30..31    */
                i_ldil = ((((( i_ldil | 10 )            /* build LDIL instruction            */
                        | ( 11 << 1 ) )
                        | ( 12 << 14 ) )
                        | ( 13 << 16 ) )
                        | ( 14 << 12 ) );
/*
** get physical address of relay point for LDIL instruction
*/
                hp_inst = (char *)
                        lpa( (caddr_t) relay );
/*
** did it work ?
*/
                if( hp_inst == 0 )
                {
                    rc = RME_ZAP_INSTALL;
                    u.u_error = (short) rc;
                    goto rme_exit;
                }
/*
** sync cache
*/
                scache ();
/*
** insert LDIL instruction
*/
                stwas( hp_inst, i_ldil );
/*
** flush cache
*/
                fcache ( KERNELSPACE,
                        (caddr_t) relay,
                        flush_length );
/*
** sync cache
*/
                scache();
/*
** wait for cache to sync
*/
                while( i_ldil != *((unsigned long *)
                        ( (caddr_t) relay ) ) )
                {}
/*
** build second part of relay branch - BE,n
*/
                i_be = i_be | 0xe0202002;               /* set opcode                        */
```

```
        w_offset = ((unsigned long) location & 0x000007ff );
        w_offset = w_offset / sizeof ( int * );
        w_sign = ( w_offset & 0x00010000 ) >> 16;     /* get sign bit        */
        w1 = ( w_offset & 0x0000f800 ) >> 11;          /* build w1            */
        w = ( w_offset & 0x00000400 ) >> 10;           /* get w2[ 10 ]        */
        w2 = ( w_offset & 0x000003ff ) >> 1;           /* make roon for w2[10 ] */
        w2 = w2 | w;                                    /* build w2            */
        w = w_sign;                                     /* build w             */
        i_be = ( ( ( i_be | w )                         /* build BE instruction */
              | ( w1 << 16 ) )
              | ( w2 << 2 ) );
/*
** get physical address for BE instruction
*/
        hp_inst = (char *)
              lpa((( (caddr_t) relay ) + sizeof( int * ));
/*
** did it work ?
*/
        if( hp_inst == 0 )
        {
          rc = RME_ZAP_INSTALL;
          u.u_error = (short) rc;
          goto rme_exit;
        }
/*
** sync cache
*/
        scache ()
/*
** insert BE instruction
*/
        stwas( hp_inst, i_be );
/*
** flush cache
*/
        fcache ( KERNELSPACE,
              ( ( (caddr_t) relay ) + sizeof( int * ) ),
              flush_length );
/*
** sync cache
*/
        scache()
/*
** wait for cachee to sync
*/
        while( i_be != *((unsigned long *)
              ( ( (caddr_t) relay ) + sizeof( int * ))))
        { }
/*
** build or r0,r0,r0 and set in 2nd and 3rd words
*/
        i_or = 0x8000240;
/*
** get physical address for OR instruction
*/
        hp_inst = (char *)
              lpa((( (caddr_t) relay ) + ( 2 * sizeof( int * )));
/*
** did it work ?
*/
        if( hp_inst == 0 )
        {
          rc = RME_ZAP_INSTALL;
          u.u_error = (short) rc;
          goto rme_exit;
        }
/*
** sync cache
*/
        scache();
/*
** insert OR instruction
*/
        stwas( hp_inst, i_or );
/*
** flush cache
*/
        fcache ( KERNELSPACE,
              ( ( (caddr_t) relay ) + ( 2 * sizeof( int * ))),
```

```
                  flush_length );
/*
** sync cache
*/
        scache()
*/
** wait for cachee to sync
*/
        while( i_or != *((unsigned long *)
                  ( ( (caddr_t) relay ) + ( 2 * sizeof( int * )))))
            { }
/*
** get physical address for OR instruction
*/
        hp_inst = (char *)
                  lpa((( (caddr_t) relay ) + ( 3 * sizeof( int * )));
/*
** did it work ?
*/
        if( hp_inst == 0 )
            {
              rc = RME_ZAP_INSTALL;
              u.u_error = (short) rc;
              goto rme_exit;
            }
/*
** sync cache
*/
        scache ();
/*
** insert OR instruction
*/
        stwas( hp_inst, i_or );
/*
** flush cache
*/
        fcache ( KERNELSPACE,
                  ( ( (caddr_t) relay ) + ( 3 * sizeof( int * ))),
                  flush_length );
/*
** sync cache
*/
        scache()
/*
** wait for cache to sync
*/
        while( i_or != *((unsigned long *)
                  ( ( (caddr_t) relay ) + ( 3 * sizeof( int * )))))
            { }
/*
** built last part of relay branch - BL
*/
        new_branch = old_branch & 0xffe0e002;      /* set opcode              */
        w_offset = w_displacement;
        w_offset = w_offset / sizeof ( int * ) ;   /* divide by word size     */
        w_sign = ( w_offset & 0x00010000 ) >> 16;  /* get sign bit            */
        w1 = ( w_offset & 0x0000f800 ) >> 11;      /* build w1                */
        w = ( w_offset & 0x00000400 ) >> 10;       /* get w2[ 10 ]            */
        w2 = ( w_offset & 0x000003ff ) << 1;       /* make room for w2[ 10 ]  */
        w2 = w2 | w;                               /* build w2                */
        w = w_sign;                                /* build w                 */
        new_branch = ( ( ( new_branch | w )        /* build BL instruction    */
            | ( w1 << 16 ) )
            | ( w2 << 2 ) );
/*
** get physical address for OR instruction
*/
        hp_inst = (char *)
                  lpa( ( (caddr_t) function ) + offset );
/*
** did it work ?
*/
        if( hp_inst == 0 )
            {
              rc = RME_ZAP_INSTALL;
              u.u_error = (short) rc;
              goto rme_exit;
            }
/*
** sync cache
```

```
*/
        scache ()
/*
** insert BL instruction
*/
        stwas( hp_inst, new_branch );
/*
** flush cache
*/
        fcache ( KERNELSPACE,
            ( (caddr_t) function ) + offset,
            flush_length );
/*
** sync cache
*/
        scache ()
/*
** wait for cache to sync
*/
        while( new_branch != *((unsigned long *)
                ( ( (caddr_t) function ) + offset ) ) )
        { }
        break;
      }
      else
      {
/*
** opcode not what we expected
*/
        rc = verzap_error;
        u.u_error = (short) rc;
        goto rme_exit;
      }
      break;
    default:
/*
** unknown or unsupported action requested
*/
        rc = RME_UNSUPPORTED_ACTION;
    }
rme_exit:
/*
** return to caller
*/
    return( rc );
}
```

I claim:

1. A method of hooking an operating system in a computer system, the operating system including program code, said method comprising:

(a) preparing an area within an address range of a relative branch instruction supported by the computer system by storing in said area an instruction or instructions to be performed or data to be used after hooking; and (b) inserting into the operating system program code a relative branch instruction that specifies said prepared area, wherein, when executed, said relative branch instruction will direct said operating system to perform the instruction or instructions stored in said prepared area.

2. The method of claim 1, wherein the computer system is a multi-processor system.

3. The method of claim 1, wherein the work area is within an address range that is used by the operating system during initialization but is not used by the operating system thereafter.

4. A method of dynamically altering a program of instructions, referred to as code, being executed by a computer that supports a relative branch instruction, the method comprising:

(a) providing new code within a permissible address range for relative branch instructions by storing in said range an instruction or instructions to be performed or data to be used after hooking; and (b) inserting into the code a relative branch instruction directing the computer system to begin executing the new code, wherein, when executed, said relative branch instruction will direct said operating system to perform the instruction or instructions stored in said prepared area.

5. The method of claim 4, wherein the computer system is a multi-processor system.

6. The method of claim 4, wherein the new code is provided within an address range that is used by the computer system during initialization but not thereafter.

7. A program storage device readable by a computer and encoding instructions executable by the computer for performing the operations recited in a specified one of claims 1–6.

* * * * *